Sept. 18, 1956  C. S. RUDEEN  2,763,501
TRIGGER, KNIFE AND STRAND GUIDE FOR TWINE KNOTTERS
Filed Dec. 11, 1952  3 Sheets-Sheet 3
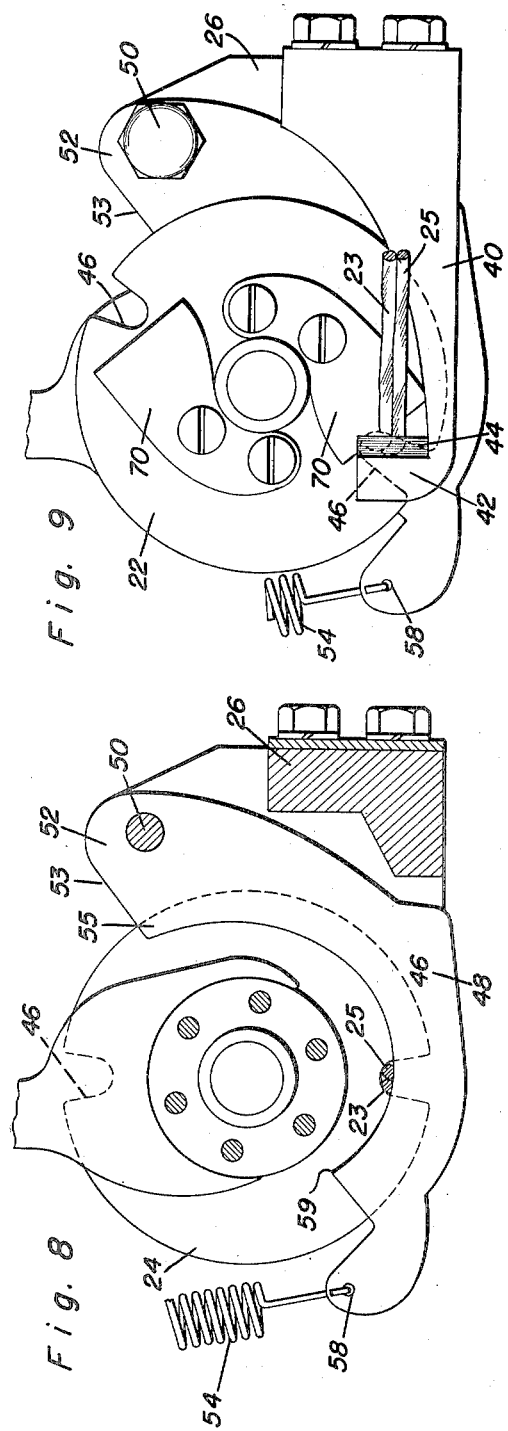
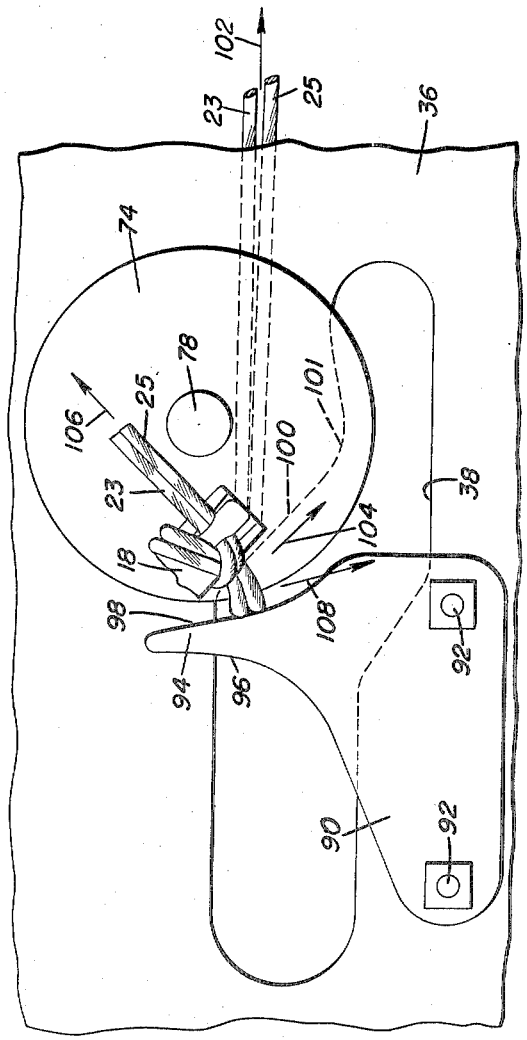
Carl S. Rudeen
INVENTOR.

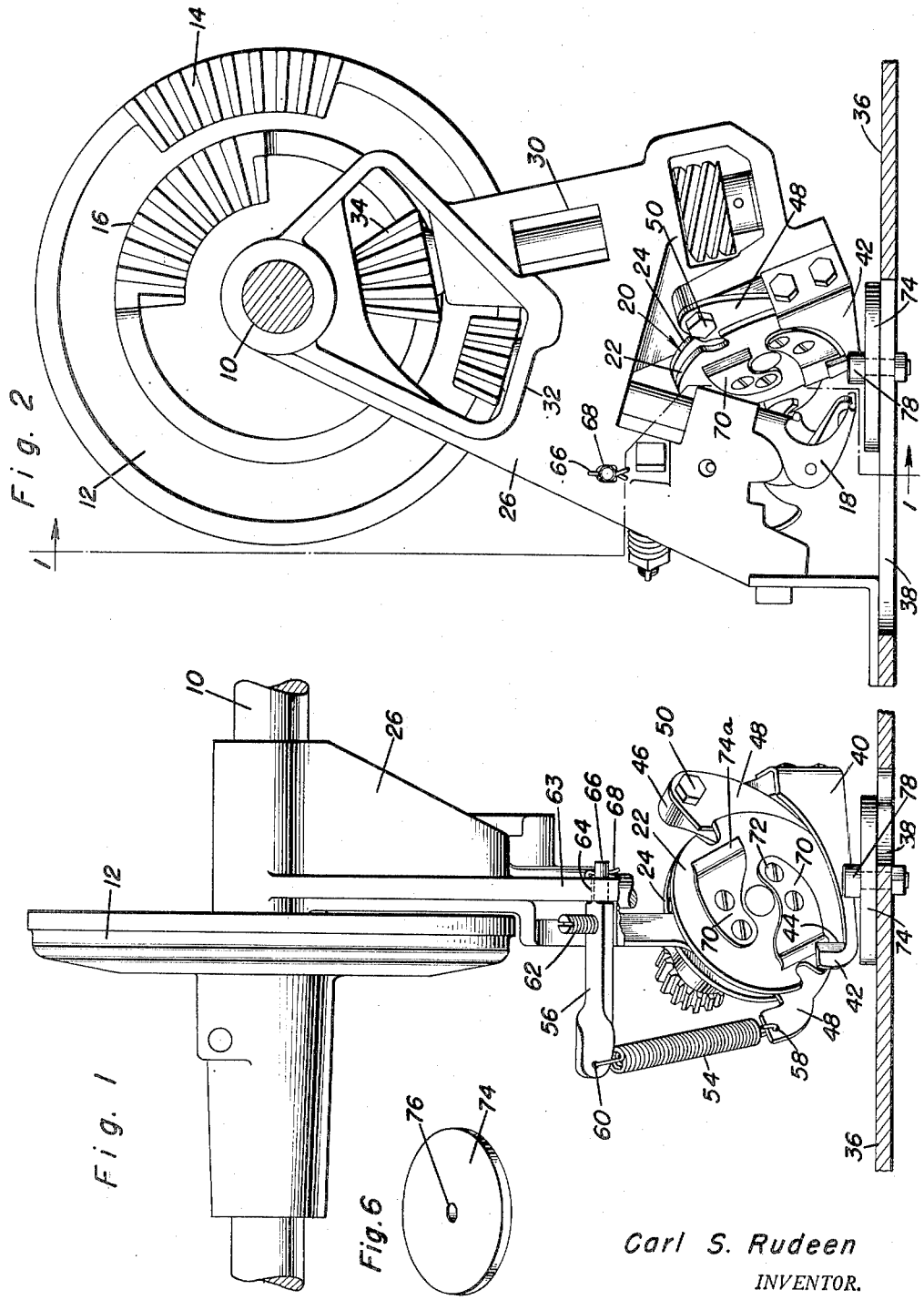

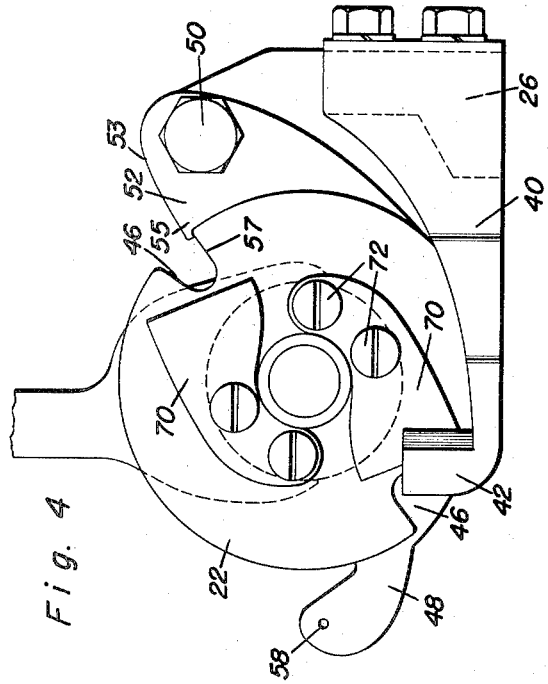
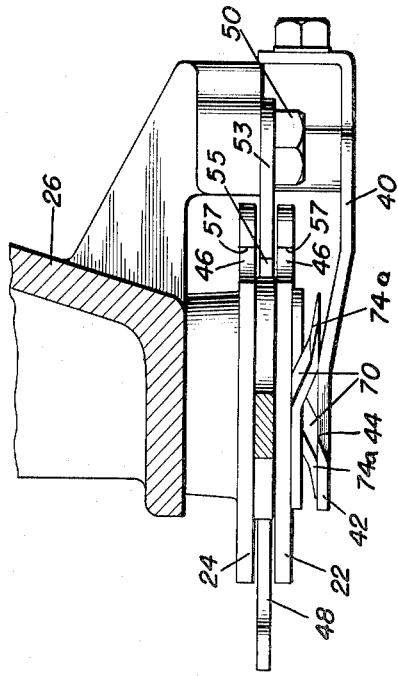
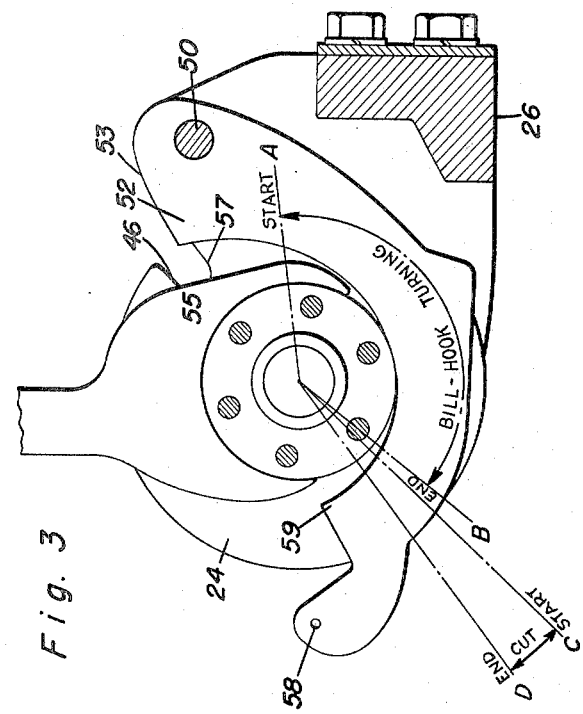
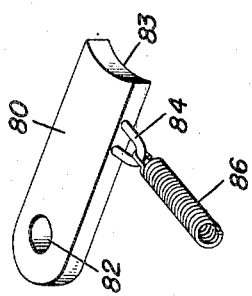

United States Patent Office 2,763,501
Patented Sept. 18, 1956

2,763,501

TRIGGER, KNIFE AND STRAND GUIDE FOR TWINE KNOTTERS

Carl S. Rudeen, Pocatello, Idaho

Application December 11, 1952, Serial No. 325,303

13 Claims. (Cl. 289—10)

This invention comprises novel and useful improvements in a trigger, knife and strand guide for twine knotters, more specifically pertaining to a mechanism to facilitate and render more effective the tying of knots in strands and particularly strands of twine for use in balers, for improving the cutting of the twine as the knot is being made, and facilitating and improving the removal of the twine knot from the bill hook of the device.

The basic purpose of the present invention is to provide an improved twine knotter which will substantially eliminate the various causes of the frequent mis-ties now encountered in conventional twine knotters to the end that the knotter will form a perfect and satisfactory knot on substantially every bale and without attendance.

A first important object of the invention is to improve the operation of twine knotters, thereby eliminating a frequent source of mis-ties, by providing a twine holder mechanism wherein the bale strands are placed and guided in the holder plate notches with certainty, being positively prevented from passing between the trigger and holder plates, and are securely retained therein in an improved manner during the forming of the knot.

A second important object is to improve the operation of twine knotters, thereby eliminating another frequent source of mis-ties, by providing an improved trigger construction and operation which will automatically maintain a reduced resilient holding pressure upon the strands in the holder plate notches, to allow the necessary controlled slippage of the strands through the notches during operation of the bill hook in the knot forming operation, and will apply increased resilient pressure upon the strands during the strand severing operation of the knife assembly.

A third important object is to provide a knife assembly for twine knotters which will sever the strands with a precisely timed, positive shearing action to thereby eliminate wear upon the knife assembly and an imperfect strand cutting operation which is a frequent cause of mis-ties.

A fourth important object is to provide an improved strand guide which will facilitate the movement of the knot from the bill hook during the completion of the knot forming operation; will prevent the pressure exerted by the bale in the bale chamber, upon the upper baling strand especially, from pulling this upper strand around the conventional bulge in the bale chamber slot thereby causing an improper position of this strand which will prevent proper closing of the bill hook, which improper positioning of the upper strand is another frequent source of mis-ties.

Other ancillary and more specific objects of the invention are to provide a baling strand holder assembly which will subject a pair of baling strands of irregular cross sections to the same holding presure by holding the same in the same holder plate notches; to provide an improved shearing action for the knife assembly by mounting auxiliary knives upon a holder plate for cooperation with the conventional fixed knife; to provide an improved trigger construction which will guide the strands into the holder plate notches, prevent passage of the strands between the sides of the holder plates and under the holder trigger, and which will automatically vary the resilient holding pressure of the trigger upon the strands during the knot forming operation; to provide improved means to facilitate the accurate adjustment of the tension of the trigger spring; and to provide a movable strand guide which will positively prevent pull of a bale from causing improper positioning of the upper baler chamber strand relative to the bill hook, and after the severing of the strands will resolve the pull of the bale on the baling strands into a lateral component which in the rest position of the bill hook will facilitate the removal of the knot therefrom.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a fragmentary elevational view, taken substantially upon the plane indicated by the broken section 1—1 of Figure 2, and showing certain structural features and the arrangement of the invention;

Figure 2 is an elevational view, parts being shown in vertical section, of the twine knotter embodying therein the principles of this invention;

Figure 3 is a detail view partly in elevation and partly in vertical section showing a portion of the holding mechanism of the invention;

Figure 4 is an enlarged view taken from the other side of Figure 3 and showing in particular the stationary and movable knives in accordance with this invention;

Figure 5 is a horizontal sectional view of the knife assembly of Figures 3 and 4;

Figure 6 is a perspective view of a guide roller forming a part of this invention;

Figure 7 is an enlarged perspective view of a modification of a guide means which may be substituted for the guide roller of Figure 6;

Figure 8 is an enlarged view similar to Figure 3 illustrating the operation of the holder;

Figure 9 is an enlarged view similar to Figure 4 illustrating the action of the improved knife assembly in severing the strand; and, Figure 10 is an enlarged fragmentary top plan view illustrating the operation of the strand guide and the relative positions of the associated parts.

Conventional baling machine knot tyers are not entirely satisfactory in their operation owing to frequent mis-ties, these sometimes running as high as 10 to 15 per hundred bales. As a result of such faulty operation it has in some instances become necessary and customary for the machine operator to provide an attendant for the purpose of manually tying the mis-ties. This practice results in a requirement for more labor and greater expense as well as in a loss of time and twine.

It has been found that mis-ties arise chiefly from the following causes:

1. Failure of the trigger to apply sufficient pressure to the strands in the notches of the holder plates, causing slippage of the strands during the operation of the bill hook resulting in too loose a bale tie.

2. Breakage or cutting of the strands in the holder plates by failure of the strands to be positioned properly in the holder plate notches, resulting in severing of the strands between the sides of the holder plates and the trigger or pressure plate.

3. Ineffective cutting of the strands by the knife assembly after the bill hook has completed its rotation. The operation of the bill hook and of the rotating holder plates drags the strands laterally across the stationary knife blade, dulling the blade. Moreover, very little movement of the strands past the stationary knife by the holder plates is possible, causing failure to completely sever the strands.

4. The improper positioning of the baling chamber top strand with reference to the bill hook whereby the strand interferes with proper closing of the bill hook. This faulty operation arises from the pull of the bale in the baling chamber dragging the top baling chamber strand around the conventional bulge in the baling chamber top wall slot.

The improved knotter disclosed hereinafter is adapted to overcome each of the above mentioned causes of misties.

Disclosed in the accompanying drawings forming a part of this specification is a conventional form of a twine knotter to which has been applied the improvements constituting the present invention. This conventional twine knotter construction includes a substantially horizontally disposed drive shaft 10 with which the customary twine knotter of a baling mechanism is provided, there being fixedly secured to the drive shaft 10 and revolving therewith a gear plate 12 having the usual and segmental gears 14 and 16 disposed circumferentially thereon and for respectively operating a bill hook assembly 18 and a strand holder assembly 20 respectively.

The latter includes the usual parallel discs 22 and 24 which constitute the holder plates. Also carried by the drive shaft 10 and loosely journaled thereon is a knotter frame upon which is suitably mounted the bill hook and the twine holder assemblies 18 and 20, together with the driving shafts 28 and 30 for the same, having beveled gears 32 and 34 respectively engageable with the gears 14 and 16, whereby operation of the bill hook and the twine holder assemblies is effected in properly timed relation with respect to each other as well as with respect to the other mechanism of the baler with which the twine knotter is associated.

A portion of the top wall of the bale chamber is indicated at 36 having a slot 38 therein for passage therethrough of the baling strands from the bale chamber and of the usual baler needle, not shown, and which is adapted to carry strands of the baling twine from the baling chamber to the twine holder assembly in a well known manner.

The conventional assembly further includes the strand severing knife consisting of a stationary knife bracket 40 having a knife blade 42 in one end thereof provided with a beveled knife edge 44. In the conventional assembly the strands carried by the twine holder assembly, after being knotted upon the bill hook by rotation thereof, are carried against the knife blade and severed.

In the conventional twine knotter, the conventional holder plates 22 and 24 are provided each with several peripheral notches, the notches of the two plates registering with each other, and which are adapted to receive in separate notches a strand of the twine to be knotted. The conventional twine knotter assembly still further includes as a part of the twine holder assembly, a trigger or pressure plate 48 in the form of a curved lever which is pivoted at one extremity as by a bolt 50 to a portion of the knotter frame, and which lies between the holder plates 22 and 24 for sliding movement therebetween, this trigger or pressure plate serving to press the strands to be knotted into the registering notches of a pair of the holder plates.

The above described elements are all conventional, being well known in the art and are well understood as forming parts of conventional twine knotters of the type especially employed for baling presses and the like. It is to such a conventional arrangement that the improvements and features of the present invention are specifically adapted and designed.

*Twine holder assembly*

In the conventional twine knotter holder assembly the holder plates 22 and 24 are customarily provided with a pair or more of oppositely disposed peripheral notches upon each plate, each notch receiving one of the two strands which are to be tied. The use of two separate notches to each receive a strand while employing a single trigger or pressure plate to hold the strands in the notches frequently gives rise to undesired slippage of the strand if different portions of the same are of different thicknesses. In the present invention a single pair of registering notches is employed, to receive both baling strands which are to be tied, these notches 46, however, being of a greater depth than the conventional notch in order that both strands may be placed therein at the same time and thus may be both held at the same point by the trigger or pressure plate 48, as shown in Figure 8.

To improve the action of the trigger in positioning and in holding a pair of strands in the enlarged peripheral registering notches of the two plates, a different shape of trigger is employed.

As shown more clearly in Figures 3 and 4, the trigger or pressure plate 48 is widened to provide a shoulder 52 adjacent its pivot bolt 50, so that this shoulder will lie within the peripheries of the plates 22 and 24 thereby preventing twine from being drawn under the trigger before the notches 46 of the revolving plates receive the strands. The trigger shoulder includes a sloping surface or edge 53 which is inclined towards but slightly above the axis of rotation of the holder plates 22, 24 to direct the strand laid upon the plates by the needle, not shown, into the registering notches 46. An important feature of this construction is that the end 55 of the edge 53 overhangs or overlies the leading or forward edge 57 of the notches 46 to constitute a guide surface whereby the strands will drop off from 55 into the notches 46 insuring a proper positioning of the strands in the notches. Since the shoulder 52, and especially the edge 53 and end 55 close the space between the plates 22, 24 at the forward edge of the notches 46, any possibility of the strands being drawn across the periphery of the plates and below the trigger lower surface in advance of the edge 57 of the notches 46, which in the holder plate assemblies of the conventional knotters is a frequent cause of breakage or severing of the strands when the trigger or pressure plate was clamped upon the strands, is substantially completely eliminated.

In order to improve the operation of the trigger and of the holder assembly in general in the tying of knots for balers, an adjustable tensioning means for the trigger is provided. This consists of a trigger spring 54 which may be of the tension spring type and an adjustable spring support or anchor 56. The end of the trigger 48 opposite to the pivot 50 is provided with an aperture 58 into which the hooked end of the spring 54 may be releasably secured. The trigger spring support or anchor preferably consists of a strip or bar 56 having an aperture 60 in one end adapted to receive the other end of the trigger spring 54, and is adapted to be adjustably mounted, as by a set screw 62 in any desired manner upon a portion of the frame 26 of the twine knotter.

As so far described, it will be apparent that by adjusting the trigger spring support 56 by the set screw 62, that an adjustable variable tension may be applied to the spring 54 and thus to the trigger 48 to vary the force or pressure with which the trigger retains the pair of strands in the notches 46 of the holder plates.

One satisfactory means for permitting the set screw 62 to adjust the trigger spring support 56, is indicated in Figure 1. As will be seen, the knotter frame 26 is provided with a rib 63 which is apertured as shown in dotted lines at 64. The end of the support 56 is provided with a reduced extension 66 which is loosely received in the aperture 64, and is retained therein as by a cotter key or the like 68. Thus, by this cotter key the support is retained on the frame 26 but is freely movable thereon, and this movement is adjusted by the set screw 62 extending through the support 56 and engaging a suitable shelf or bracket forming a part of the frame. As viewed in Figure 1, adjusting the set screw downwardly through the support 56 will serve to elevate the support and thereby increase the tension of the spring 54.

Adjacent that end to which the spring 54 is attached, the trigger 48 has an incurving projection or end portion 59. Because of the shape of the trigger as illustrated in the drawings an unusual and improved functioning of the holder assembly is effected, as follows:

With the holder plates and bill hook in the position shown in Figures 1–4 which is the normal position of the parts preparatory to the operation of forming and tying a knot, it is assumed that the two ends 23, 25 of a baling tie, one end passing into the needle, not shown, are positioned in the aligned notches 46 of the pair of holder plates 22, 24. Because of the tension on these strands, and because of the provision and arrangement of the trigger portions 53 and 55 relative to the plates 22, 24 and their notch edges 57, the strands are positioned in the notches.

As the holder assembly begins to rotate, the notches 46 pass beyond, and the strands are clamped therein by the curved or concave surface of the trigger. When the notches and strands reach the radial position indicated by the line O—A of Figure 3, the bill hook begins its rotation. It should be noted that the gear segments 14 and 16 are synchronized to effect this timed operation.

When the strands 23, 25 in the notches 46 pass beneath the trigger they necessarily move the latter about its pivot 50 against the resilient pressure of the trigger spring 54, the latter applying a resilient holding pressure to the trigger and upon the strands. This pressure is the reduced resilient holding pressure referred to in this specification and is manually adjusted and varied by the adjustment 62 hereinbefore set forth. This condition of reduced resilient pressure continues, as shown in Figure 8, until the radial position O—B of the notches and strands is reached as shown in Figure 3. At this position, the bill hook completes its movement, being in the position shown in Figures 1, 2 and 10. At this point, also, the gear segment 14 has passed and disengaged the gear 32, leaving the bill hook idle until the next revolution of the disk 12. During this movement, the reduced resilient holding pressure permits the strands 23, 25 to slip through the holding notches during the rotation of the bill hook to provide the necessary slack in the strands to prevent breakage in forming a knot thereon.

The gear segment 16, however, still drives the holder assembly until at the position O—C the strand cutting operation by the knife assembly begins, this operation being completed at the position O—D.

At about the position O—C, the strands 23, 24 in the notches 46 engage the incurved portion 59, their frictional drag lifting the trigger upwardly in the direction in which it is urged by the spring 54, thereby causing a self-tightening action of the trigger effecting an increase in the trigger pressure upon the strands. Their action locks the strands against any further slippage through the holder plate notches and holds the strands rigidly taut for efficient severing, securely holds the top baling strand during the next bale filling operation and is the condition of increased resilient pressure referred to in this specification. It will thus be seen that the trigger shape and mounting automatically effects the periods of reduced and increased holding pressure upon the strands.

*Knife assembly*

In conventional knotters which employ a stationary knife alone to sever the strands, the rubbing of the strands across the knife edge during the severing operation rapidly wear and dull the knife blade and result in frequent incomplete strand severage causing mis-ties of the knot.

As will be seen from Figures 1, 2, 4, 5, 9, the holder assembly 20 is disposed to one side of the stationary knife 42. Consequently, as the holder plates 22, 24 rotate, carrying therewith the strands 23 and 25 which are clamped in the notches 46, they drag the strands laterally across the knife edge 44, as the holder plates and strands clamped thereto continue rotating after the strands engage the knife. This scraping of the strands across the knife edge 44 eventually dulls the knife so that it no longer causes complete severage of the strands. This defect is augmented by the fact that in conventional tyers very little movement of the strands past the knife assembly is possible by the holder plates. This lack of continued motion and the dulling of the knife together cause frequent failures of the knife assembly to completely sever the strands, resulting in mis-ties.

In order to improve the efficiency of the severing knife, a pair of auxiliary knife blades 70 are secured to the sides of the holder plates 22 as by fasteners 72.

These auxiliary knives 70 have beveled knife edges 74a, which as shown in Figure 5 extend laterally away from the holder plate 22 and are positioned substantially adjacent the notches 46 to engage the stationary knife edge 44 with a shearing action during rotation of the cutter plates. Thus, the motion of the strands past the stationary knife blade is no longer relied upon to sever the strands, but the positive shearing action of the stationary blade and the auxiliary blades provides a superior and much more effective severing means for the strands.

*Strand guide means*

A further improvement and very important feature of this invention resides in the provision of a movable guide means to assist in directing the strand from the needle towards and across the holder plate notches 46; to maintain the bailing chamber top strand in proper position adjacent the bill hook to insure the forming of the knot; to facilitate the removal of the strands from the bill hook after their severance by the knife assembly to complete the tying of the knot.

This guide means, in its preferred form, comprises a guide roller 74, which is centrally apertured at 76, whereby it is secured to a pivot pin 78 mounted upon the top wall 36 of the baling chamber adjacent to the slot 38, the holder plates and the bill hook.

For a clearer understanding of the novel arrangement and functioning of the movable guide roller, attention is specifically directed to Figure 10. The conventional baler has a guide plate 90 secured by fasteners 92 to the top wall 36 of the baler chamber in a position to overlie the slot 38 adjacent the bill hook and holder assemblies. The guide plate includes a tapering portion 94 having oppositely disposed concave side edges 96 and 98 all extending laterally across the longitudinal slot 38 and above the wall 36 in spaced relation thereto.

When the needle moves up through the slot 38 on the left of the portion 94, it lays a strand across the holder plates for positioning in the notches 46. Upon rotation of the bill hook this strand is drawn across the top wall 36 below the portion 94 and upon the surfaces 94 and 96 to the slot 38 at the right of the portion 94. The right end of the slot has an inclined side wall shown in dotted lines at 100, the lower end of this inclined side wall constituting the bulge 101 referred to hereinbefore. The pressure or pull of the bale in the bale chamber, upon the bale strands 23, 25 is in the direction of the arrow 102. Since this pressure pulls the strands against the inclined edge 100 of the slot 38, there is a component of this force along the edge 100 in the direction of the arrow 104. If unopposed this force would pull the top strand of the baling chamber down the edge 100 and around the bulge 101. When the top baling strand has passed the bulge 101 and moved to the right end of the slot 38, it is in a position where it will interfere with the proper closing of the bill hook tongue. This force is resisted however by the force in the direction of the arrow 106, exerted upon the portion of the strands extending from the bill hook to the strand holder assembly. When this last mentioned portion is severed by the knife assembly, the forces acting in the directions 102 and 104 are now effective to draw the loop of the knot from off the bill hook, which still retains the severed portion of the strands, thus completing the knot as the bale is expelled from the bale chamber in the direction of the arrow 102.

If the angle of the edge 100 is made substantially perpendicular to the direction 102 in order to prevent the top baling chamber strand from sliding past the bulge 101, the bale is no longer capable of pulling the knot from the bill hook. These difficulties are completely overcome in a satisfactory and practicable manner by the movable guide member 74.

With this guide installed as in Figure 10, it will be apparent that the strand portion under tension of the bale engages the periphery of the roller 74 upon a surface which is almost perpendicular to the direction 102, the direction of the resultant thrust being indicated by the arrow 108. The pull of the holder assembly in the direction of the arrow 106 is obviously entirely capable of resisting the thrust along the line 108 whereas it was frequently uneffective against the thrust along the line 104 produced by the edge 100.

The roller 74 thus provides a guide means which entirely prevents pulling of the knot from the bill hook prior to severing of the strands by the knife assembly.

Still further, when the strands are severed the component of force in the direction 108 causes arcuate movement of the strand with the periphery of the roller 74, thus pulling the knot in the direction 104 which is substantially the direction in which the bill hook faces after it completes its rotation, thereby facilitating the stripping of the knot from the hook and completing its tying.

The movable guide roller 74 thus performs two functions which cannot be performed by the conventional inclined edge 100, namely a completely successful opposing of the pull of the bale until the strands are severed and thereafter a more effective completing of the knot by stripping the loop from the bill hook.

In place of the roller guide 74, there may be employed a modified guide construction including an oscillating guide member 80, see Figure 7, in the form of a flat bar which is apertured at one end as at 82 to be received upon the above mentioned pivot pin 78 and has a concave, strand receiving recess 83 upon its opposite end. Secured to one side of the guide 80 is a spring 86, suitably anchored at one end to the top wall 36, and which urges the guide bar into predetermined position. Suitable stop pins, not shown, limit the oscillatory travel of the bar to suitable positions. With its aperture 82 pivoted upon the pin 78 and with its recess 83 facing the surface 98, and its spring 86 urging the surface 83 towards the guide plate portion 94, the oscillating guide will perform exactly the same functions as the guide roller 74 as set forth above.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly all suitable modifications and equivalents may be resorted to, falling within the scope of the appended claims.

What is claimed as new is as follows:

1. A strand holder assembly for twine knotters comprising a pair of parallel holder plates mounted for rotation about a common axis, an elongated holder trigger mounted at one end for pivotal movement towards and from said axis and movable between said holder plates about an axis parallel to said first mentioned axis, said plates having peripheries with registering cord receiving notches therein, said trigger having a guide surface extending longitudinally thereof and extending from beyond the peripheries of the holder plates to within said peripheries to insure positioning of a strand lying across said peripheries into said notches and to preclude passage of a strand between said peripheries and said trigger, resilient means operatively engaging the other end of said trigger and yieldingly urging the trigger between said holder plates, said other end of the trigger being rearwardly of the pivoted trigger end relative to the direction of rotation of the holder plates.

2. A strand holder assembly for twine knotters comprising a pair of parallel holder plates mounted for rotation about a common axis, an elongated holder trigger mounted at one end for pivotal movement towards and from said axis and movable between said holder plates about an axis parallel to said first mentioned axis, said plates having peripheries with registering cord receiving notches therein, said trigger having a guide surface extending longitudinally thereof and extending from beyond the peripheries of the holder plates to within said peripheries to insure positioning of a strand lying across said peripheries into said notches and to preclude passage of a strand between said peripheries and said trigger, resilient means operatively engaging the other end of said trigger and yieldingly urging the trigger between said holder plates, said other end of the trigger being rearwardly of the pivoted trigger end relative to the direction of rotation of the holder plates, the surface of the trigger lying between its ends and adjacent said common axis being curved from said pivoted end of the trigger towards said common axis throughout the major portion of the length of the trigger.

3. The combination of claim 2 including means for maintaining a relatively reduced resilient pressure of the trigger upon a strand disposed in said notches during the initial portion of the rotation of the plates and for causing a relatively increased pressure thereof during a later portion of the rotation of the plates.

4. The combination of claim 2 wherein each of said notches is deep enough to receive the baling strands from both the top and the bottom of a baler chamber.

5. A strand holder and knife assembly for twine knotters comprising a pair of parallel holder plates mounted for rotation about a common axis, a holder trigger mounted for pivotal movement about an axis parallel to said first mentioned axis and movable between said holder plates, said plates having peripheries with registering cord receiving notches therein, a stationary knife blade, a movable knife blade mounted on one of said holder plates and cooperating in operative shearing relation with said stationary knife blade.

6. A knife assembly for twine knotters comprising a stationary knife blade carried by the frame of a twine knotter, a revolvable holder plate comprising part of a strand holder assembly, a movable blade mounted upon said holder plate for rotation therewith and cooperating in operative shearing relation with said stationary knife blade.

7. A strand holder assembly for twine knotters comprising a pair of parallel holder plates mounted for rotation about a common axis, an elongated holder trigger mounted at one end for pivotal movement about an axis parallel to said first mentioned axis and movable between said holder plates, said plates having peripheries with registering cord receiving notches therein, a spring operatively attached to the other end of said holder trigger and yieldingly urging the latter between said holder plates, the pivoted end of the trigger being forwardly of the other end relative to the direction of rotation of the holder plates.

8. A strand holder assembly for twine knotters comprising a pair of parallel holder plates mounted for rotation about a common axis, an elongated holder trigger mounted at one end for pivotal movement about an axis parallel to said first mentioned axis and movable between said holder plates, said plates having peripheries with registering cord receiving notches therein, a spring operatively attached to the other end of said holder trigger and yieldingly urging the latter between said holder plates, said holder trigger having an arcuate mid-portion movable between said plates, said mid-portion being bowed outwardly from the axis of said plates, the pivoted end of the trigger being forwardly of the other end relative to the direction of rotation of the holder plates.

9. A strand holder assembly for twine knotters comprising a pair of parallel holder plates mounted for rotation about a common axis, an elongated holder trigger mounted at one end for pivotal movement about an axis parallel to said first mentioned axis and movable between said holder plates, said plates having peripheries with registering cord receiving notches therein, a spring operatively attached to the other end of said holder trigger and yieldingly urging the latter between said holder plates, said holder trigger having an arcuate mid-portion movable between said plates, said mid-portion being bowed outwardly from the axis of said plates, the pivoted end of the trigger being forwardly of the other end relative to the direction of rotation of the holder plates, and having a curved concave inner surface, a guide surface on said holder trigger extending from between said plates to a location radially beyond the peripheries of the plates to insure by said inner surface the positioning of a strand lying across said peripheries into said notches and to preclude by said guide surface the passage of a strand between said peripheries and said trigger.

10. A strand holder assembly for twine knotters comprising a pair of parallel holder plates mounted for rotation about a common axis, an elongated holder trigger mounted at one end for pivotal movement about an axis parallel to said first mentioned axis and movable between said holder plates, said plates having peripheries with registering cord receiving notches therein, a spring operatively attached to the other end of said holder trigger and yieldingly urging the latter between said holder plates, said holder trigger having at its pivoted end a guide surface extending between said holder plates, said guide surface having an end which overhangs said notches, said trigger having a curved surface extending from said end of said guide surface towards the other end of said trigger, the pivoted end of the trigger being forwardly of the other end relative to the direction of rotation of the holder plates.

11. The combination of claim 10 wherein said curved surface has an end portion remote from said guide surface and which projects radially inwards towards the axis of rotation of said holder plates whereby the engagement of twine disposed in said notches with said end portion will tend to pivotally move said trigger in a direction to increase the force of its gripping action on the twine.

12. The combination of claim 1 wherein said guide surface includes a concave surface on the face of the trigger adjacent the axis of rotation of said plates, said concave surface having its end portion remote from the pivot of the trigger projecting radially inwards towards the axis of rotation of said holder plates to thereby tend to increase the trigger pressure on the twine when the latter engages said end portion.

13. The combination of claim 6 wherein said movable blade is mounted upon the proximate face of the holder plate which is adjacent to the stationary blade.

References Cited in the file of this patent

UNITED STATES PATENTS

| | | |
|---|---|---|
| 257,837 | Appleby | May 16, 1882 |
| 372,506 | Whiteley | Nov. 1, 1887 |
| 419,154 | Miller | Jan. 7, 1890 |
| 741,296 | Benjamin | Oct. 13, 1903 |
| 744,153 | Appleby | Nov. 17, 1903 |
| 991,834 | Dangel | May 9, 1911 |
| 1,257,465 | Dudley | Feb. 26, 1918 |
| 2,405,688 | Crumb | Aug. 13, 1946 |
| 2,594,140 | England | Apr. 22, 1952 |
| 2,644,703 | Rudeen | July 7, 1953 |

FOREIGN PATENTS

| | | |
|---|---|---|
| 11,419 | Great Britain | A. D. 1888 |